(12) United States Patent
Usher (10) Patent No.: US 11,746,228 B2
(45) Date of Patent: *Sep. 5, 2023

(54) POLYESTER COMPOSITION WITH IMPROVED DYEING PROPERTIES

(71) Applicant: Parkdale Incorporated, Gastonia, NC (US)

(72) Inventor: Robert Alton Usher, Charlotte, NC (US)

(73) Assignee: PARKDALE INCORPORATED, Gastonia, NC (US)

(*) Notice: Subject to any disclaimer, the term of this patent is extended or adjusted under 35 U.S.C. 154(b) by 461 days.

This patent is subject to a terminal disclaimer.

(21) Appl. No.: 16/804,944

(22) Filed: Feb. 28, 2020

(65) Prior Publication Data

US 2021/0269636 A1 Sep. 2, 2021

(51) Int. Cl.
| | |
|---|---|
| *C08L 67/02* | (2006.01) |
| *C08K 3/22* | (2006.01) |
| *C08K 5/092* | (2006.01) |
| *C08K 5/053* | (2006.01) |
| *D04H 3/015* | (2012.01) |
| *D04H 3/011* | (2012.01) |
| *D01F 9/26* | (2006.01) |
| *D06M 15/507* | (2006.01) |
| *C08K 5/11* | (2006.01) |

(52) U.S. Cl.
CPC .......... *C08L 67/02* (2013.01); *C08K 3/2279* (2013.01); *C08K 5/053* (2013.01); *C08K 5/092* (2013.01); *C08K 5/11* (2013.01); *D01F 9/26* (2013.01); *D04H 3/011* (2013.01); *D04H 3/015* (2013.01); *D06M 15/507* (2013.01)

(58) Field of Classification Search
CPC ...................................................... C08L 67/02
See application file for complete search history.

(56) References Cited

U.S. PATENT DOCUMENTS

| | | | |
|---|---|---|---|
| 5,272,246 A | 12/1993 | Roderiguez | |
| 6,067,785 A * | 5/2000 | Russell | D01F 6/92 57/400 |
| 10,174,454 B2 | 1/2019 | Usher, Jr. | |
| 10,351,995 B2 | 7/2019 | Usher, Jr. | |
| 2017/0073887 A1* | 3/2017 | Usher, Jr. | D01F 2/00 |
| 2018/0273680 A1* | 9/2018 | Usher, Jr. | B29C 48/05 |

FOREIGN PATENT DOCUMENTS

EP 3141636 B1 11/2019

* cited by examiner

*Primary Examiner* — Andrew T Piziali
(74) *Attorney, Agent, or Firm* — Lauren E. Burrow; Moore & Van Allen PLLC (57) ABSTRACT

A copolymer composition is disclosed with advantages for textile fibers, yarns, blended yarns, fabrics, and garments. The composition includes polyester copolymer, between about 9.5 and 10.5 percent adipic acid based on the amount of copolymer, between about 630 and 770 parts per million (ppm) of pentaerythritol based on the amount of copolymer, and between about 3.4 and 4.2 percent polyethylene glycol based on the amount of copolymer.

11 Claims, 6 Drawing Sheets

ALPHA

POLYESTER COMPOSITION WITH IMPROVED DYEING PROPERTIES

RELATED APPLICATIONS

This application is related to Ser. No. 15/858,308, filed Sep. 7, 2016 for "Polyester Composition with Improved Dyeing Properties" and now U.S. Pat. No. 10,174,454, issued Jan. 8, 2019, ("U.S. Ser. No. 10/174,454"); and to Ser. No. 15/258,338, filed Sep. 7, 2016 for "Polyester Composition with Improved Dyeing Properties," and now U.S. Pat. No. 10,351,995 ("U.S. Ser. No. 10/351,995") issued Jul. 16, 2019; and to copending application Ser. No. 16/190,772, filed Nov. 14, 2018" for "Polyester Composition with Improved Dyeing Properties," and to both of Ser. No. 16/804,973 for "Polyester Composition with Improved Dyeing Properties," and Ser. No. 16/804,927 for "Polyester Composition with Improved Dyeing Properties," both filed concurrently herewith.

BACKGROUND

The present invention relates to polyester copolymer compositions suitable for synthetic filaments and to fibers and fabrics that can be made from such compositions. In particular, the invention relates to compositions that will produce fibers that can be blended and dyed with cotton under conditions that are more typically favorable for cotton than for polyester.

The use of synthetic compositions to produce filaments, fibers, and then fabrics is well established. Accordingly, improvements in such entrenched compositions can be particularly advantageous. Such improvements are, of course, more valuable when they enhance desired characteristics of filaments, fibers, fabrics, and items—very often clothing— made from such compositions.

Working backwards, a garment is typically formed of a fabric that is either woven or knitted from yarns. In turn, yarns are formed from individual fibers joined together, most commonly using well known and well established spinning processes.

Natural fibers—the most common are cotton and wool— have characteristics that produce desired properties in yarns, fabrics, and garments. For example, wool has (among other advantages) excellent thermal properties, and remains insulating when wet. Unless treated properly, however, wool can be abrasive and thus uncomfortable when in contact with skin for extended intervals. Cotton produces fabrics that are comfortable and breathable, but can lose its thermal insulation properties when wet. Further advantages of cotton, wool, and other natural fibers are generally well understood in the art.

In the same manner, synthetic fibers have some properties that are subjectively better then natural fibers, some of which can include (particularly in the case of polyester) strength, durability, and "memory."

Accordingly, one of the goals in producing or designing or developing synthetic compositions for eventual use as fibers, yarns and fabrics is to take advantage of some of the favorable properties of synthetics, while matching as closely as possible—or in some cases improving upon—the desired properties of natural fibers (e.g., the thermal insulation of wool, but less abrasive; the comfort of cotton, but with better thermal properties when wet).

In the clothing industry, the ability to produce garments with desired colors is a fundamental goal. The nature of both natural and synthetic fibers and their underlying chemical compositions requires, however, that color be obtained by some type of dyeing process. Depending upon circumstances, fibers can be dyed as fiber, filament, yarn, fabric, or even as a garment. Furthermore, because in many cases consumers expect to be able to wash and dry garments in machines many times, an associated goal is to obtain garments that can withstand such repeated machine washing and drying while still maintaining most or all of the desired color. Related goals include light fastness (typically with respect to exposure to sunlight) and (using active wear as another example) color stability when exposed to perspiration.

Fundamentally, the relationship between the color of a garment and its lifetime will be based upon the chemical composition of the underlying fibers and the chemical composition of an appropriate dye composition. As is well understood in the art, a dye is technically defined as "a colorant that becomes molecularly dispersed at some point during application to a substrate and also exhibits some degree of permanence." Tortora, FAIRCHILD'S DICTIONARY OF TEXTILES, Seventh Edition, 2009 Fairchild Publications.

Dye is typically categorized as either natural (e.g., from plants) or synthetic (e.g., typically developed from other compositions using principles and techniques of organic chemistry).

The dyeing characteristics of a fiber are based upon the composition from which the fiber is formed. The desired property is referred to as "dyeability," which is defined as the "capacity of fibers to accept dyes." (Tortora, supra).

In the manufacture or garments, it is also common to blend synthetic fibers with natural fibers in proportions that produce a finished garment with desired properties. For a number of reasons, blends of cotton and polyester have long been popular. Based on that, compositions and methods for producing dyed color in cotton-polyester blends has been and remains a desired outcome. The natures of the two different fibers, however, present practical problems. For example, cotton can be conveniently dyed with "reactive dyes" that can be successfully added to a cotton substrate at temperatures of about 65° C. (about 150° F.).

On the other hand, the properties of polyester (i.e., the polymer formed from the condensation esterification and then polymerization of terephthalic acid and ethylene glycol) required that polyester be dyed with "disperse dyes;" i.e., small particles of colorant suspended in water.

Coloring polyester with disperse dyes tends to require significantly higher temperatures; typically above about 120° C. (about 250° F.) and frequently on the order of about 130° C. (about 270° F.) or higher. In many cases, high pressure (i.e., above atmospheric pressure) is also required to successfully dye polyester, or to reach the temperatures required to dye the polyester.

As further comparative factors, cotton dyeing tends to be driven by the pH of the dye solution or composition (typically in a basic environment); while polyester dyeing tends to be driven by the temperature, and conventionally requires the addition and performance of supplementary chemicals commonly referred to as "carriers" or "leveling agents." From the standpoint of economics, disperse dyes (sometimes referred to as "high energy" dyes because of the conditions required) are more expensive than reactive dyes, and sometimes by as much as a factor of 5-10 times on a comparative basis.

Because of the differences in the dyeing compositions and the dyeing conditions, it is conventional practice to dye cotton and polyester separately.

In some conventional methods, blended cotton-polyester fabric is dyed in two separate steps. In a first step, the fabric is dyed in a slightly acidic bath at a temperature of about 130° C. (about 270° F.) or higher (e.g., using a disperse dye) in order to get the polyester to accept the dye. The partially dyed fabric is then scoured or rinsed, and thereafter dyed in a cotton-appropriate dye (e.g., a direct or reactive dye) at a basic pH and at a temperature of about 65° C. (about 150° F.). Because many cotton dyestuffs will degrade at the polyester dying temperatures, the two steps cannot be combined.

As another factor that must be addressed, high dyeing temperatures tend to degrade the elasticity of stretch fibers such as spandex that are often included in cotton-polyester fabrics and garments. Some versions of spandex can withstand high dyeing temperatures (e.g., about 130° C.), but are proportionately more expensive than versions that have essentially the same end-use properties, but that tend to degrade when dyed at such higher temperatures.

As yet another factor, perceived color (e.g., of a garment) is a combination of the interaction of light, the material the light illustrates, and the resulting perception of the human eye. In terms of textile dyeing, the color of the dye is based upon the functional groups in the dye molecules. Stated differently, different colors in textiles are a function of dye molecules with different compositions. Not all dye colors (i.e., the underlying molecules) perform, however, in the same manner with either natural or synthetic fibers, yarns, or garments. Thus a fiber, yarn, blend, or fabric may accept certain dye colors relatively straightforwardly while rejecting (to some greater or lesser extent) other dye colors under the same conditions.

Furthermore, additives are often used to control or adjust the properties of a polymer melt, and the features of such additives are likely to change either the dyeing characteristics or the spinning characteristics or both.

As another factor, synthetic fibers—and certainly including polyester—are typically manufactured by polymerizing the starting materials and thereafter extruding a melt of the polymer through small openings in a device referred to as a spinneret; a process referred to as "spinning" Those experienced in synthetic and natural fibers will immediately recognize that the term "spinning" is used to refer to two entirely different processes. In one meaning (and since antiquity) spinning refers to the step of twisting individual fibers together and pulling them into a yarn. In the manufacture of synthetic fibers, the extrusion of filaments from a melt into solidified polymer filaments is also referred to as "spinning" The difference is normally clear in context. Typically, the solidification of the extruded filaments is encouraged or advanced using a quenching step, in which a carefully controlled airflow is directed against the extruded filaments.

The properties required of a composition that can be melt and spun in this fashion, however, may be unrelated to, or disadvantageous in combination with, the properties that produce good dyeing characteristics. Composition characteristics that produce the proper viscosity for spinning may be entirely unrelated, and in some cases directly opposite to, those properties that produced good dyeing characteristics. Thus, designing or adjusting the composition of a polymer, copolymer or copolymer blend to improve the spinning properties may result in less desired or even unacceptable dyeing properties.

For example, in order to "spin" properly, a melted polymer must have a certain fluidity (viscosity) that permits the extrusion to produce coherent liquid filaments (i.e. that won't separate) at the spinneret while avoiding a viscosity that too low ("watery") to control the spinning process for its intended purpose. Because the viscosity of a polymer melt is proportional to temperature, the degree of polymerization, and to other polymer properties, the spinning temperature must be appropriate as well. Stated differently, the melted polymer must be able to perform at the indicated temperature.

In the context of synthetic fibers and their manufacture, the term "melt viscosity" refers to the specific resistance of the melted polymer to deformation or flow under any given conditions. The term "intrinsic viscosity" is used to describe a characteristic that is directly proportional to the average molecular weight of a polymer. Intrinsic viscosity is calculated on the basis of the viscosity of a polymer solution (in a solvent) extrapolated to a zero concentration. Thus, the intrinsic viscosity is a characteristic that will affect the melt viscosity, but the melt viscosity is also related to other factors, particularly including the temperature of a melt.

As yet another factor, because synthetic fibers originate as a filament, they must be cut and textured (not necessarily in that order) to gain other properties that are desirable in a finished yarn, fabric, or garment. In most cases, the texturing step requires that the synthetic filament or fiber be mechanically or thermally formed into a shape other than a straight extruded filament. Accordingly, the need to texturize polyester adds another set of properties that must be accounted for and that may compete against the properties that enhance polymerization, spinning, or dyeing.

Thus, a need exists for polymer compositions that can produce a fiber that can be dyed with cotton in a single step.

SUMMARY

In one aspect the invention is a composition with advantages for textile fibers. In this aspect, the invention is a melt of polyester precursors selected from the group consisting of terephthalic acid, dimethyl terephthalate, and ethylene glycol; adipic acid in an amount sufficient to give filaments and fibers made from the melt a dye receptively similar to cotton at atmospheric pressure; pentaerythritol in an amount sufficient to give pill resistance to yarns blended of cotton with fibers made from the melt; and polyethylene glycol in an amount sufficient to give the melt the elasticity necessary to produce extruded filament from the melt. The melt is maintained at a temperature of between about 265° C. and 295° C., and at an intrinsic viscosity of between about 0.58 and 0.82.

In another aspect, the invention is a copolymer composition with advantages for textile fibers. In this aspect the invention includes polyester copolymer, between about 9.5 and 10.5 percent adipic acid based on the amount of copolymer, between about 630 and 770 parts per million (ppm) of pentaerythritol based on the amount of copolymer, and between about 3.4 and 4.2 percent polyethylene glycol based on the amount of copolymer.

In another aspect, the invention is a method of spinning a polyester copolymer filament. The method includes the steps of polymerizing terephthalic acid, ethylene glycol, between about 9.5 and 10.5 percent adipic acid, between about 630 and 770 ppm pentaerythritol, and between about 3.4 and 4.2 percent polyethylene glycol to a copolymer melt with between about 2 percent and 3 percent DEG, at an intrinsic viscosity of between about 0.58 and 0.82 and at a temperature of between about 265° C. and 295° C., with the proportional amounts being based on the amount of polymerized copolymer, and then spinning the resulting polyester copolymer melt into filament.

In another aspect, the invention is a method of coloring yarn blended from cotton and textured polyester copolymer staple in which the yarn is between about 20 percent and 80 percent by weight cotton. The textured polyester staple has a composition of between about 9.5 and 10.5 percent adipic acid based on the amount of polyester copolymer, between about 630 and 770 parts per million of pentaerythritol based on the amount of polyester copolymer, between about 3.4 and 4.2 percent polyethylene glycol based on the amount of polyester copolymer, and between about 2 percent and 3 percent diethylene glycol based on the amount of polyester copolymer. The dyeing step is carried out at atmospheric pressure and a temperature below 212° F. (100° C.).

In another aspect, the invention is a blended yarn. The yarn contains between about 20 percent and 80 percent by weight cotton and textured polyester copolymer as the remainder. The textured polyester staple has a composition of between about 9.5 and 10.5 percent adipic acid based on the amount of polyester copolymer, between about 630 and 770 parts per million (ppm) of pentaerythritol based on the amount of polyester copolymer, between about 3.4 and 4.2 percent polyethylene glycol based on the amount of polyester copolymer, and between about 2 percent and 3 percent diethylene glycol based on the amount of polyester copolymer.

The foregoing and other objects and advantages of the invention and the manner in which the same are accomplished will become clearer based on the followed detailed description.

DETAILED DESCRIPTION

As set forth herein, the goal of the invention is to produce a fiber that is based upon polyester (polyethylene terephthalate) that, if desired, can be dyed with cotton in a single bath or single vessel.

In one aspect the invention is a composition with advantages for textile fibers. In this aspect, the invention is a melt of polyester precursors selected from the group consisting of terephthalic acid, dimethyl terephthalate, and ethylene glycol; adipic acid in an amount sufficient to give filaments and fibers made from the melt a dye receptively similar to cotton at atmospheric pressure; pentaerythritol in an amount sufficient to give pill resistance to yarns blended of cotton with fibers made from the melt; and polyethylene glycol in an amount sufficient to give the melt the elasticity necessary to produce extruded filament from the melt. The melt is maintained at a temperature of between about 265° C. and 295° C., and at an intrinsic viscosity of between about 0.58 and 0.82.

As well understood in the art, cotton is typically dyed with reactive or direct dyes at temperatures of about 65° C. (about 150° F.; i.e., well below the boiling point of water) and atmospheric pressure. Polyester is typically, and necessarily, dyed with dispersed dyes which require much higher temperatures (above 120° C. in most cases) and thus also may require pressurized equipment (above atmospheric pressure conditions) in order for the dye dispersion to penetrate the polyester. Cotton dying tends to be sensitive to pH, while polyester typically requires additives referred to as carriers or leveling agents (such as fatty acid derivatives) which function to help the dye migrate throughout the substrate material.

In the textile art, terms such as "texturing" and "crimping," are used both broadly and specifically. In the broadest sense, texturing and crimping are used as synonyms to refer to steps in which synthetic filament, staple fiber, or yarn is mechanically treated, thermally treated, or both, to have a greater volume then the untreated filament, staple, or yarn. In a narrower sense, the term crimping is used to describe the production of a two dimensional saw tooth orientation in a filament, fiber or yarn, while the term texturing is used to refer to treatments that produce looping and curling. The meaning is generally clear in context. In the specification and claims, the word "texture" is used in a broad sense to include all possibilities for producing the desired effect in a filament, staple fiber, or yarn.

Thus, according to the invention, it has been unexpectedly determined that the presence of diethylene glycol in percentages above about 3% lead to problems dyeing cotton polyester blends with certain dye colors under cotton-favorable conditions.

Based on additional trial compositions and then dyeing and color fastness testing, the invention provides a polyester copolymer that will dye with cotton with much better results over a wider range of colors than many comparative attempts. The improved copolymer can be produced by incorporating adipic acid in an amount of between about 9.5 and 10.5%; pentaerythritol in an amount of between about 630 and 770 ppm; between about 3.4 and 4.2% of polyethylene glycol; and while maintaining the amount of diethylene glycol, (a constant byproduct of the esterification of terephthalic acid and ethylene glycol) at between about 2% and 3%. These respective amounts are all based on their proportions in the finished copolymer.

The range of 2%-3% diethylene glycol (DEG) helps the resulting polyester to hold dye better than polyesters with higher DEG levels. In some cases, the DEG is maintained at a range of between about 1.4% and 3%.

In the most helpful composition to date, the adipic acid is present at about 10%, the pentaerythritol at about 700 ppm, and the polyethylene glycol at about 3.8%.

The high level (relativity) of pentaerythritol increases the reactivity of the polymerization reaction. Thus, the conventional expectation is that a lower temperature melt is required to moderate this reactivity. In the invention, however, the pentaerythritol and the increased reactivity are allowed to increase the intrinsic viscosity of the polymer and the overall viscosity of the melt. Conventionally the intrinsic viscosity of polyester used for the filament and then staple fiber is kept at about 0.52-0.65. A less viscous melt tends to be too "watery" and an overly viscous melt tends to separate during extrusion from the spinneret (spinning).

In the invention, the intrinsic viscosity is allowed to significantly increase, and in particular to reach between about 0.58 and 0.82, with about 0.72 being exemplary. Given that conventional copolymers tend to run at lower intrinsic viscosities, the higher intrinsic viscosity of the invention is counterintuitive.

In comparison to conventional polyester melts, the spinning step is more favorably carried out at lower temperatures; i.e., below about 270° C.

Several options exist for spinning the melt at these lower temperatures.

As one option, the melt can be made using a continuous polymerizer ("CP") at the lower temperatures (e.g. 268° C.) and then spun at (or near) that lower temperature. The lower temperature of the continuous polymerizer, however, somewhat lowers throughput. This is an acceptable trade-off in many circumstances.

As another option, the continuous polymerizer can be run at more conventional temperatures (e.g., 285° C.) following which the melt can be forwarded to a heat exchanger to lower the temperature of the melt to below 270° C. (again, about 268° C. is acceptable), following which the melt is spun at the lower temperature. A heat exchanger of the necessary type is relatively expensive, however, and thus will be the best option in some, but not necessarily all, circumstances.

As a third option ("batch"), the polyester can be polymerized at more conventional temperatures (again, 285° C. is exemplary, but not limiting), then extruded at about (e.g.) 265° C.-268° C. and quenched into chip, after which the chip can be remelted and spun into filament at below 270° C. (again, 268° C. is exemplary).

The added pentaerythritol reduces the tenacity of the resulting filament, but in the invention this characteristic advantageous because it tends to reduce pilling when staple made from the filament is blended with cotton.

As known to those familiar with textiles in general and polyester fibers and blends of polyester and cotton in particular, the term "pilling" is used to describe small undesired entanglements of fibers ("pills") that can result when the surface of a fabric is abraded (including normal wear and tear). In cotton-polyester blends, pilling can be more noticeable because the strength of the polyester tends to preclude pills formed from the polyester fibers from breaking off of the fabric as easily as do pills of cotton fibers. Pilling can be tested using ASTM D3512 ("Standard Test Method for Pilling Resistance and Other Related Surface Changes of Textile Fabrics") e.g., random tumble testing; or AATCC Test Method 124-2014 ("Smoothness Appearance of Fabrics after Repeated Home Laundering").

Table 1640 illustrates a number of comparative compositions developed for the purpose of identifying the most advantageous compositions for the invention. Table 1640 includes a series of 4 experiments and 2 predictive formulations each of which was designed to produce a 1000 gram (1 Kg) batch of polymer. These batches were produced in a one kilogram NCCATT reactor, following which the filament was spun on a laboratory scale extrusion machine.

The stoichiometric relationship between organic acid and organic glycol (e.g. terephthalic or adipic acid, and ethylene glycol or methyl ethylene glycol or polyethylene glycol) is always one to one in forming polyester. Thus, the amount of terephthalic acid will be moderated as compared to U.S. Ser. No. 10/174,454 to maintain this relationship.

TABLE 1640

Table 1640 is exemplary:

|  | Units | Sample 1641 | Sample 1642 | Sample 1643 | Sample 1644 | Predictive 1645 | Predictive 1646 |
|---|---|---|---|---|---|---|---|
| TA | Grams | 772 | 772 | 772 | 772 | 811 | 733 |
| EG | ml | 391 | 391 | 391 | 391 | 411 | 371 |
| $Sb_2O_3$ | Grams | 0.3 | 0.3 | 0.3 | 0.3 | 0.3 | 0.3 |
| Cobalt Acetate | Grams | 0.09 | 0.09 | 0.09 | 0.09 | 0.09 | 0.09 |
| $TiO_2$ | Grams | 2.0 | 2.0 | 2.0 | 2.0 | 2.0 | 2.0 |
| OB | Grams | 0.2 | 0.2 | 0.2 | 0.2 | 0.2 | 0.2 |
| PEG (MW = 400) Note 1 | ml | 38.0 | 38.0 | 38.0 | 30.0 | 34.0 | 42.0 |
| Adipic Acid | Grams | 100 | 100 | 100 | 100 | 95 | 105 |
| Pentaerythritol | Grams | 1.0 | 0.7 | 0.5 | 0.7 | 0.63 | 0.77 |
| Total of Raw Materials | Grams | 1305 | 1305 | 1304 | 1296 | 1354 | 1254 |

TA = Terephthalic acid;
EG = ethylene glycol;
PEG = polyethylene glycol;
OB = optical brightener
Note 1:
add after esterification & before polymerization As Table 1640 indicates, the starting materials included appropriate catalysts and at least one optical brightener (fluorescent whitening agent). Optical brighteners are generally well understood in the art, and function by absorbing UV radiation (e.g., in the region from 360 to 380 nanometers) and re-emitting longer-wavelength, visible blue-violet light in the visible portion of the spectrum. Such compositions can be selected by the skilled person without undue experimentation, and provided that the selected brightener does not undesirably affect the desired properties of the finished copolymer, fiber, or fabrics. The starting materials also included small amounts of antimony trioxide oxide (catalyst; 0.35 g), 0.02 g of 10% phosphoric acid (thermal stabilizer), and tetramethyl ammonium hydroxide (0.160 g of a 5% solution in water; pH buffer).

TABLE 1617

| Terasil Blue WW-2GS | Terasil Blue WW-2GS | Terasil Blue WW-2GS | Terasil Blue WW-2GS |
|---|---|---|---|
| 5 ml ALPHA 99° C. Standard Polyester Exp. 50/50 OE Exp. 100% RS U.S. Pat. No. 10,174,454 | 10 ml BETA 99° C. Standard Polyester Exp. 50/50 OE Exp. 100% RS U.S. Pat. No. 10,174,454 | 15 ml CHARLIE 99° C. Standard Polyester Exp. 50/50 OE Exp. 100% RS U.S. Pat. No. 10,174,454 | 20 ml ECHO 99° C. Standard Polyester Exp. 50/50 OE Exp. 100% RS U.S. Pat. No. 10,174,454 |

TABLE 1617-continued

| Terasil Blue WW-2GS | Terasil Blue WW-2GS | Terasil Blue WW-2GS | Terasil Blue WW-2GS |
|---|---|---|---|
| 5 ml FOXTROT 90° C. Standard Polyester Exp. 50/50 OE Exp. 100% RS U.S. Pat. No. 10,174,454 | 10 ml GOLF 90° C. Standard Polyester Exp. 50/50 OE Exp. 100% RS U.S. Pat. No. 10,174,454 | 15 ml HOTEL 90° C. Standard Polyester Exp. 50/50 OE Exp. 100% RS U.S. Pat. No. 10,174,454 | 20 ml INDIA 90° C. Standard Polyester Exp. 50/50 OE Exp. 100% RS U.S. Pat. No. 10,174,454 |

| Terasil Blue WW-2GS | Terasil Blue WW-2GS | Terasil Blue WW-2GS | Terasil Blue WW-2GS |
|---|---|---|---|
| 5 ml JERICHO 85° C. Standard Polyester Exp. 50/50 OE Exp. 100% RS U.S. Pat. No. 10,174,454 | 10 ml KILO 85° C. Standard Polyester Exp. 50/50 OE Exp. 100% RS U.S. Pat. No. 10,174,454 | 15 ml LIMA 85° C. Standard Polyester Exp. 50/50 OE Exp. 100% RS U.S. Pat. No. 10,174,454 | 20 ml MIKE 85° C. Standard Polyester Exp. 50/50 OE Exp. 100% RS U.S. Pat. No. 10,174,454 |

Table 1617 summarizes test data on the fabric according to the invention and in comparison to other polyester compositions. Table 1617 is arranged so that moving across a horizontal row, all conditions are the same, but with an increasing amount of dye solution added to the can (5 mL, 10 mL, 15 mL, 20 mL). In each case the dye is Terasil Blue WW-2GS from Huntsman (https://www.huntsman.com/textile_effects/a/Solutions/Product%20Highlights/Dyes/TERASIL%20Cyan%20Blue%20WW-GS; accessed Oct. 25, 2019).

The horizontal columns are arranged for identical conditions other than temperature, which decreases from trial to trial moving downward (99° C., 90° C., 85° C.).

The dye was mixed as a 1% solution in water. This 1% solution was added in the indicated amounts (5 mL, 10, 15, 20) along with knitted tubes (socks) weighing 10 g each (+0.05 g) and the dye solution in a laboratory dye can large enough to hold at 100 mL of liquid and the sock.

2 mL of a leveling agent (e.g. https://www.huntsman.com/textile_effects/a/Products/Dyeing%20Auxiliaries/Polyester; accessed Oct. 31, 2019) were added to the dye bath, along with 1 mL of acetic acid, 2 mL of buffer (http://www.huntsman.com/textile_effects/Media%20Library/global/files/213001e_BRO_TERASIL_TC_LR.pdf; accessed Oct. 31, 2019) and sufficient water to bring the total volume of liquid in the dye can to 100 mL.

The dye bath was ramped at a rate of 2° C. per minute until it reached the indicated temperature at which it was held for about 25 minutes, followed by a 2° per minute ramp return to ambient temperature.

Figure 1:
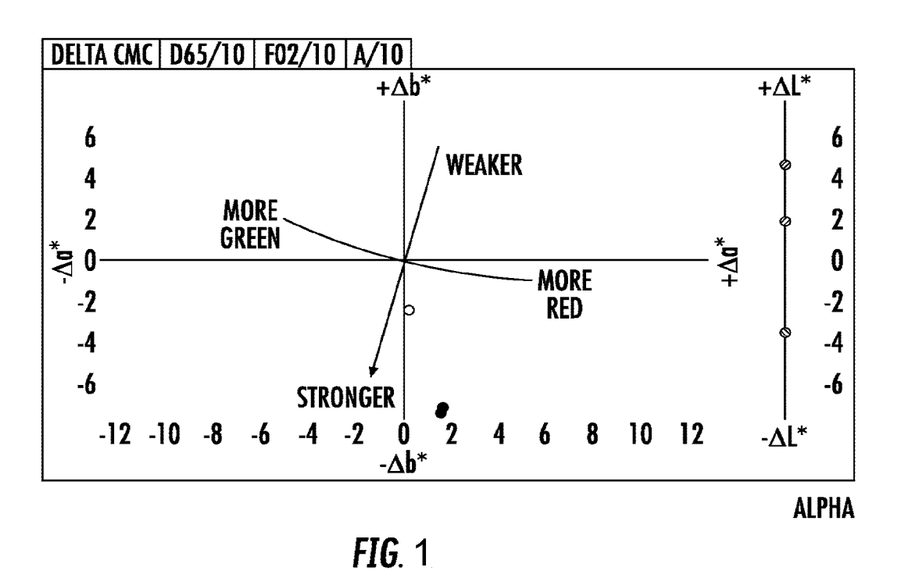
FIGS. 1 through 12 are colorimeter plots of samples dyed according to the present invention.
Figure 2:
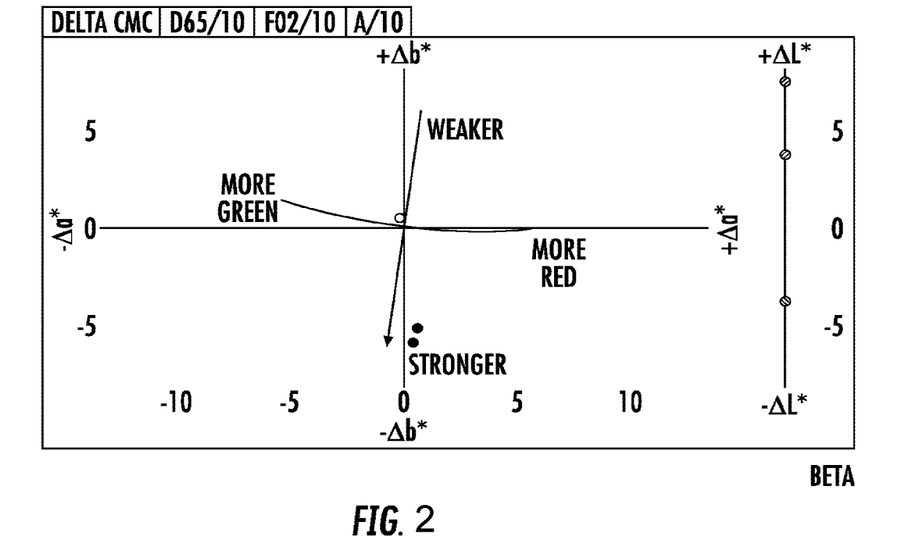
Figure 3:
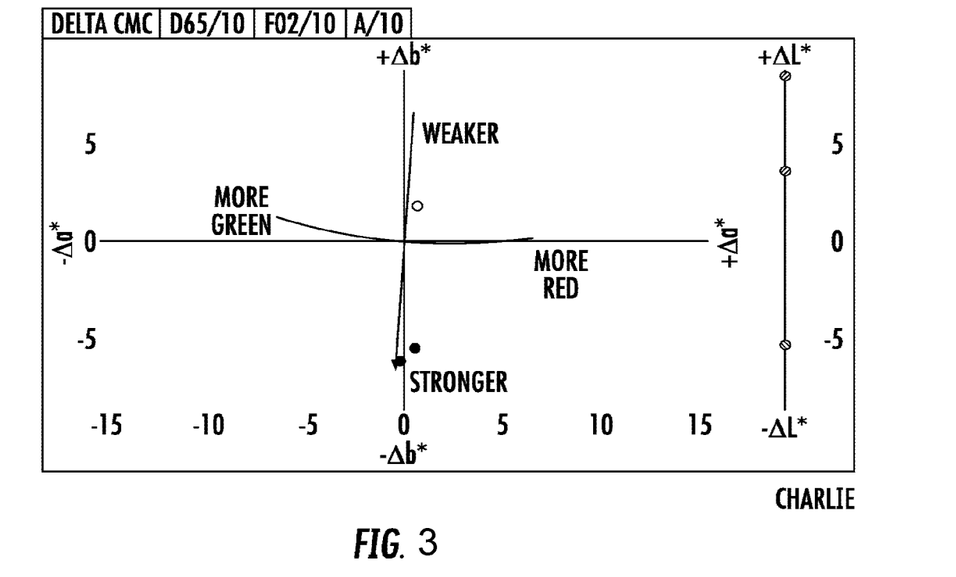
Figure 4:
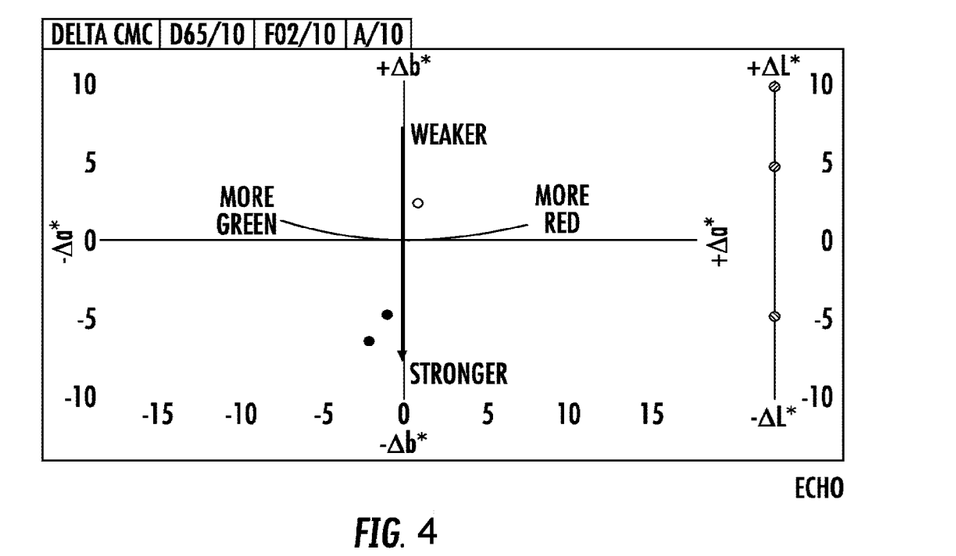
Figure 5:
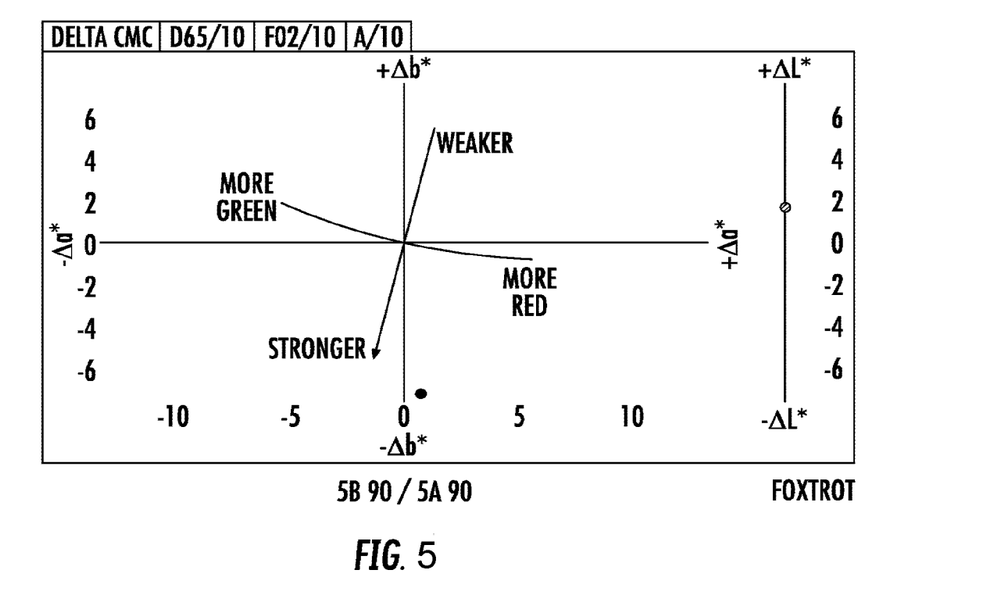
Figure 6:
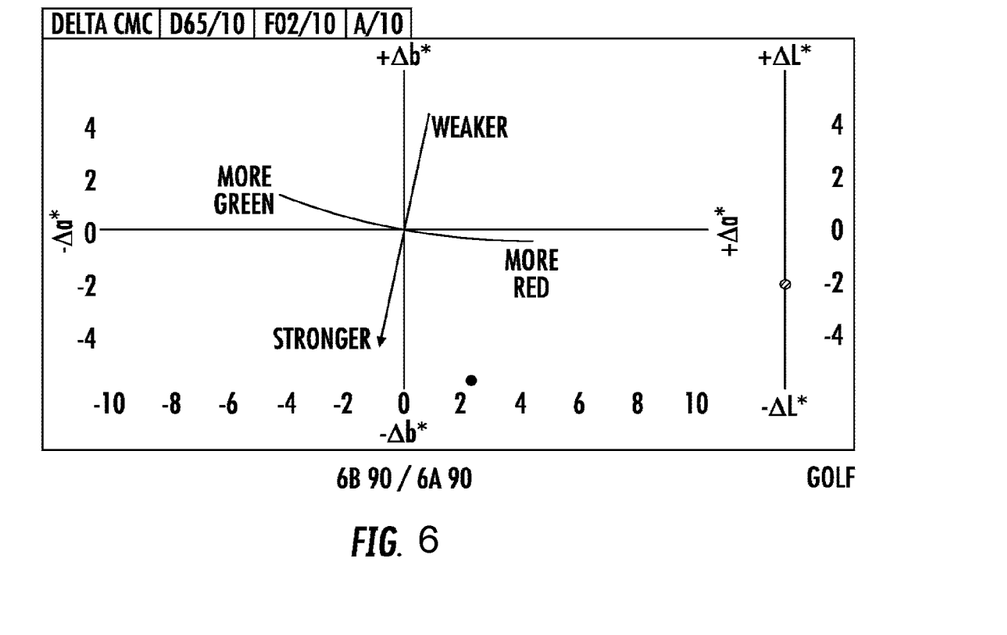
Figure 7:
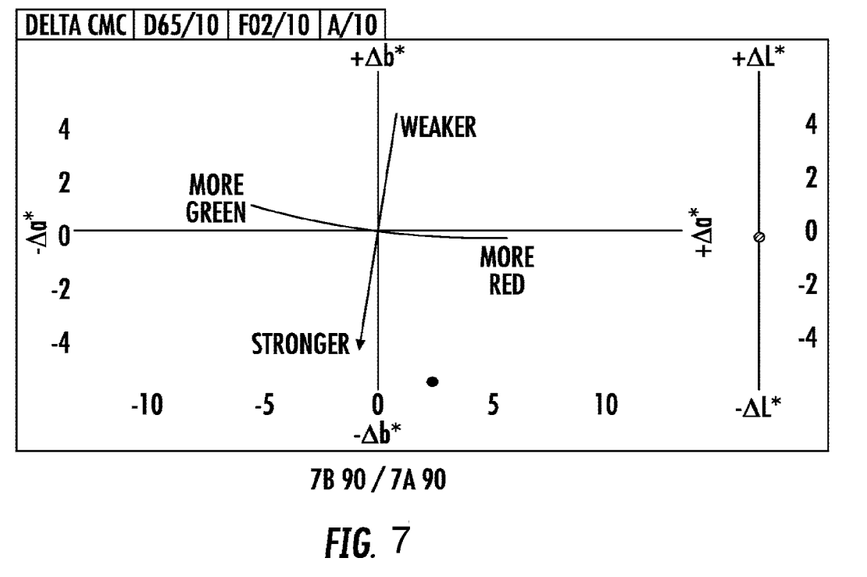
Figure 8:
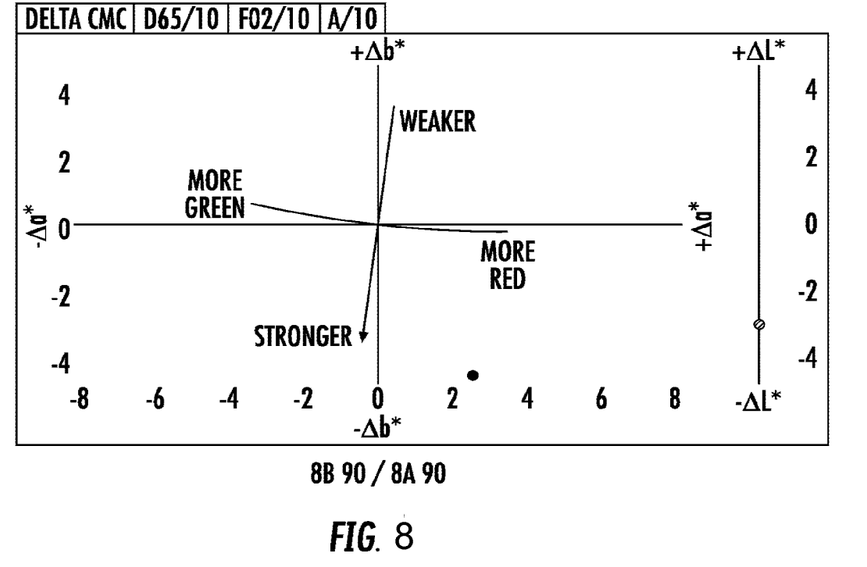
Figure 9:
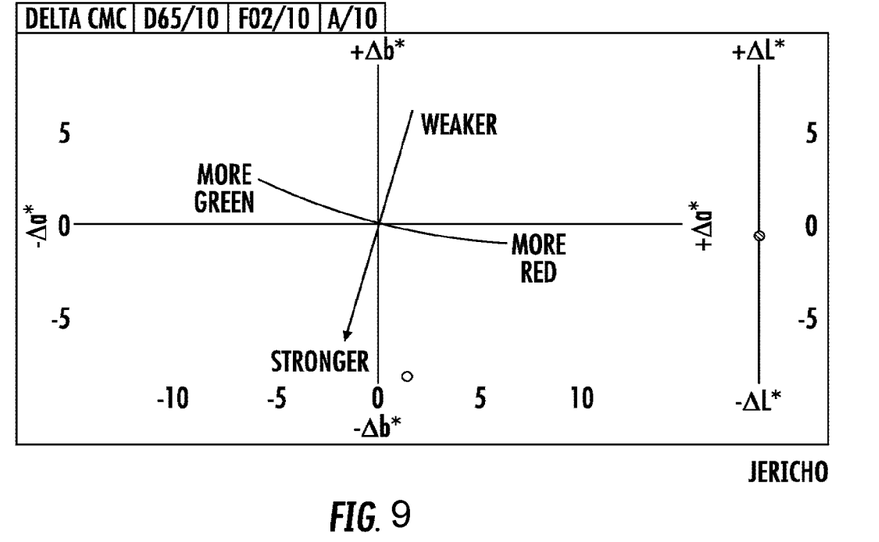
Figure 10:
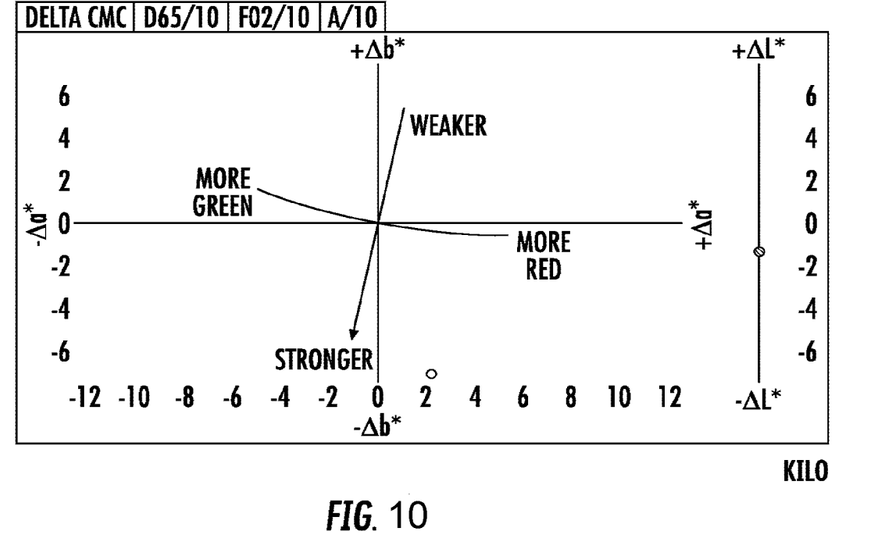
Figure 11:
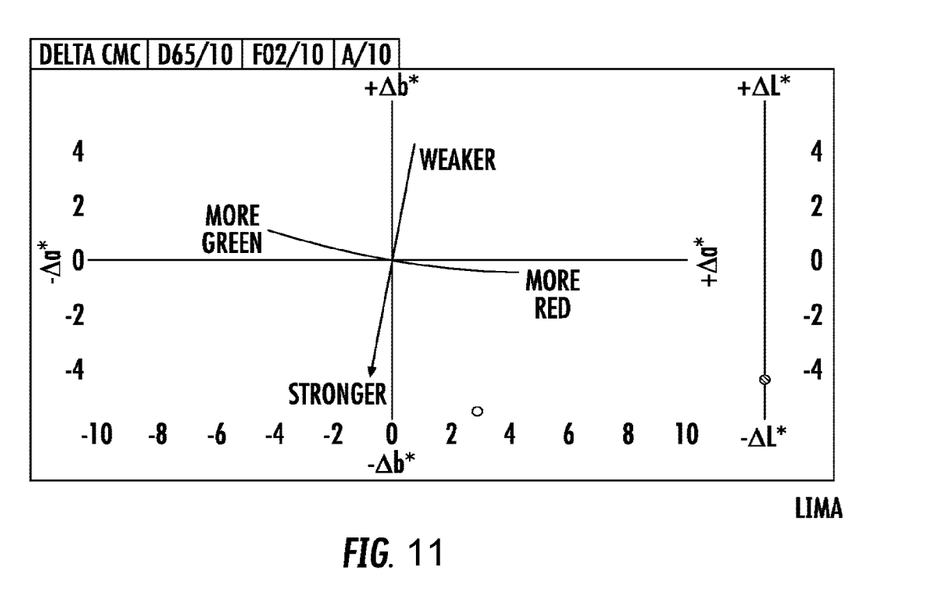
Figure 12:
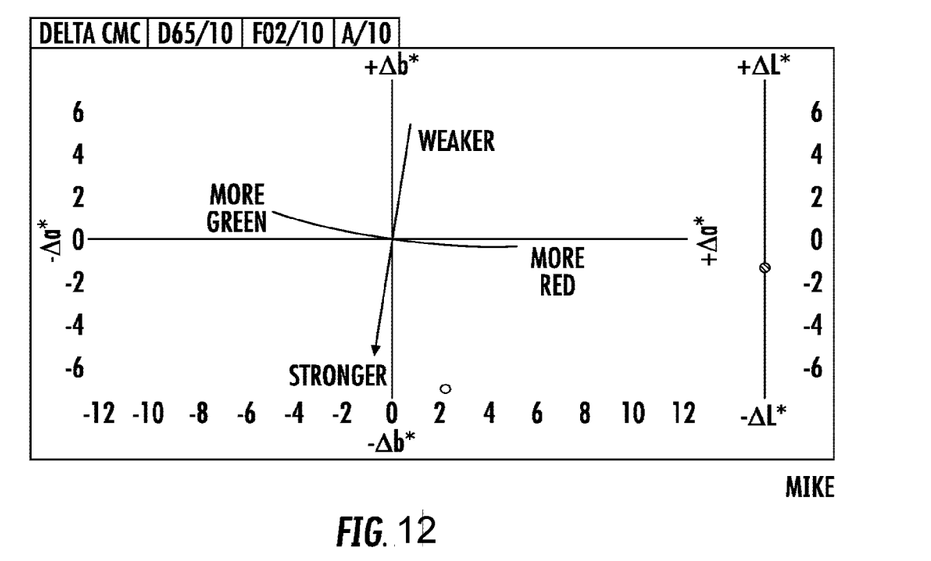

The results are categorized in FIGS. 1-12 and Tables Alpha through Mike showing $\Delta a^*$, $\Delta b^*$, $\Delta L$, and related information familiar to the skilled person. The comparisons were carried out on the Datacolor 800 spectrophotometer (https://www.datacolor.com/business-solutions/product-overview/datacolor-800-spectrophotometer/; accessed Oct. 31, 2019) with the comparison being made between socks made according to U.S. Pat. No. 10,174,454 and those made according to the present invention.

The "compass" on each graph of FIGS. 1-12 is intended to show a comparison between a sample and a standard (here U.S. Pat. No. 10,174,454). At the top of that form is the standard. The sample below it under: Submit/Sample is the batch. The circles on the centers of the graphs act as visual parameters to compare the sample to the standard. Theoretically, adding one or more of the 4 colors (yellow, red, blue or green) would align the compass arrows more closely with the axis arrows.

TABLE Alpha

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −1.78 | 0.18 | −2.24 | 1.07 | 0.56 | 2.15 |
| FO$_2$ 10° | −2.03 | 1.75 | −4.26 | 1.81 | 1.66 | 3.18 |
| A 10° | −2.07 | −0.39 | −3.64 | 1.57 | 0.74 | 2.70 |

TABLE Beta

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −2.24 | −0.25 | 0.46 | −0.21 | −0.24 | 2.26 |
| FO$_2$ 10° | −2.39 | 1.24 | −0.79 | 0.33 | 0.94 | 2.59 |
| A 10° | −2.45 | 0.23 | −0.47 | 0.16 | 0.25 | 2.47 |

TABLE Charlie

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −3.41 | 0.71 | 1.88 | −0.98 | 0.47 | 3.58 |
| FO$_2$ 10° | −3.49 | 1.76 | 1.25 | −0.59 | 1.30 | 3.77 |
| A 10° | −3.54 | 1.67 | 1.56 | −0.92 | 0.79 | 3.74 |

TABLE Echo

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −3.27 | 0.94 | 2.30 | −1.18 | 0.80 | 3.57 |
| FO$_2$ 10° | −3.25 | 1.86 | 1.91 | −0.85 | 1.48 | 3.67 |
| A 10° | −3.32 | 2.09 | 2.21 | −1.26 | 1.06 | 3.70 |

TABLE Foxtrot

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | 0.90 | 0.72 | −7.20 | 3.52 | 1.67 | 4.00 |
| F02 10° | 0.59 | 2.66 | −10.58 | 4.81 | 2.73 | 5.56 |
| A 10° | 0.47 | −2.14 | −9.29 | 4.31 | 1.07 | 4.47 |

TABLE Golf

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −1.08 | 2.32 | −5.66 | 2.67 | 2.42 | 3.76 |
| F02 10° | −1.37 | 3.86 | −8.65 | 3.82 | 3.17 | 5.15 |
| A 10° | −1.49 | −0.38 | −7.14 | 3.10 | 1.45 | 3.73 |

TABLE Hotel

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −0.14 | 1.87 | −5.61 | 2.74 | 1.95 | 3.37 |
| F02 10° | −0.37 | 3.44 | −8.51 | 3.85 | 2.76 | 4.76 |
| A 10° | −0.53 | −0.87 | −7.12 | 3.23 | 1.06 | 3.44 |

TABLE India

| Illum/Obs | $\Delta L^*$/ISL | $\Delta a^*$ | $\Delta b^*$ | $\Delta C^*$/cSC | $\Delta H^*$/SH | $\Delta$Ecmc |
|---|---|---|---|---|---|---|
| $\Delta$65 10° | −1.72 | 2.56 | −4.44 | 2.15 | 2.35 | 3.62 |
| F02 10° | −1.96 | 3.92 | −6.91 | 3.15 | 3.01 | 4.77 |
| A 10° | −2.11 | 0.09 | −5.62 | 2.44 | 1.30 | 3.48 |

TABLE Jericho

| Illum/Obs | ΔL*/ISL | Δa* | Δb* | ΔC*/cSC | ΔH*/SH | ΔEcmc |
|---|---|---|---|---|---|---|
| Δ65 10° | −0.33 | 1.37 | −8.11 | 3.92 | 2.43 | 4.63 |
| FO$_2$ 10° | −0.69 | 3.16 | −11.94 | 5.37 | 3.30 | 6.34 |
| A 10° | −0.80 | −1.95 | −10.23 | 4.72 | 1.45 | 5.01 |

TABLE Kilo

| Illum/Obs | ΔL*/ISL | Δa* | Δb* | ΔC*/cSC | ΔH*/SH | ΔEcmc |
|---|---|---|---|---|---|---|
| Δ65 10° | −0.68 | 2.20 | −6.88 | 3.31 | 2.58 | 4.25 |
| FO$_2$ 10° | −0.97 | 3.77 | −10.25 | 4.61 | 3.31 | 5.75 |
| A 10° | −1.10 | −0.93 | −8.56 | 3.85 | 1.49 | 4.27 |

TABLE Lima

| Illum/Obs | ΔL*/ISL | Δa* | Δb* | ΔC*/cSC | ΔH*/SH | ΔEcmc |
|---|---|---|---|---|---|---|
| Δ65 10° | −2.29 | 2.89 | −5.51 | 2.61 | 2.84 | 4.49 |
| FO$_2$ 10° | −2.57 | 4.32 | −8.39 | 3.78 | 3.50 | 5.76 |
| A 10° | −2.71 | −0.15 | −6.81 | 2.98 | 1.51 | 4.30 |

TABLE Mike

| Illum/Obs | ΔL*/ISL | Δa* | Δb* | ΔC*/cSC | ΔH*/SH | ΔEcmc |
|---|---|---|---|---|---|---|
| Δ65 10° | −0.72 | 2.21 | −6.63 | 3.28 | 2.35 | 4.10 |
| FO$_2$ 10° | −1.03 | 3.69 | −9.91 | 4.56 | 3.04 | 5.58 |
| A 10° | −1.17 | −0.97 | −8.24 | 3.78 | 1.28 | 4.16 |

Although the invention is not limited by any particular theory, it can be hypothesized that the adipic acid provides the dye receptivity, the pentaerythritol provides the pill resistance, and the polyethylene glycol provides the elasticity to spin the melt into filament.

Accordingly, it will be understood that in one aspect the invention is the composition: polyester, adipic acid, pentaerythritol, polyethylene glycol, or low amounts of diethylene glycol. In turn, the composition can be understood as a polymerized melt, as a polyester copolymer filament made from the melt, or as a textured filament made from the composition.

Texturing is well understood in the art and will not be otherwise described in detail, other than to point out that to date, the composition of the invention produces filament that can be textured using conventional steps (e.g., heat setting while in a twisted position).

The composition aspects of the invention also include the manufacture of staple fibers cut from the filament (typically from a textured filament), yarns, particularly blends of cotton and the polyester copolymer of the invention, dyed yarns, fabrics, dyed fabrics, and garments.

It will further be understood that the dying step can be carried out on the blended yarn, on a fabric formed from the blended yard, or even on a garment formed from the blended yarn.

In the method context, the invention includes the steps of polymerizing a charge of terephthalic acid, ethylene glycol, adipic acid in an amount of between about 9.5 and 10.5%, pentaerythritol in an amount of between about 630 and 770 ppm, polyethylene glycol in an amount of between about 3.4 and 4.2%, and between about 2% and 3% diethylene glycol. These amounts are expressed as the weight percentage of the component as compared to the total weight of the finished copolymer.

The charge is run at (or until it reaches) an intrinsic viscosity of between about 0.68 and 0.82 and at a temperature of between about 265° C. and 295° C. The melt is spun into filament in an otherwise conventional process.

The filament produced by the method can be textured and cut into staple fiber, spun into a blended yarn with cotton (typically with cotton in the range of 5-95% by weight) and dyed as yarn. Alternatively, the blended yarn can be woven or knitted into fabric and then dyed and then formed into a garment. In some circumstances, the dyeing step will be carried out on the garment, but dyeing the yarn is probably most common.

Those skilled in the art will also appreciate, however, that the filament can be used as a yarn ("filament yarn"); i.e., without being cut into staple or without being blended with another fiber (e.g., cotton). Such filament yarns are particularly advantageous in the active wear industry. In particular, filament yarn according to the invention provides the opportunity to use spandex that can be dyed at the inventive dyeing temperatures (about 80° C. to 95° C.) while maintaining all of the desired spandex properties. As set forth in the background, variations of spandex that can be dyed at high temperature are available, but at higher cost, and without any corresponding stretch or recovery advantages for active wear purposes.

Because poly-cotton blends are manufactured, sold, and used in a variety of proportions, a potentially wide range (5-95% cotton) is expressed herein. Nevertheless, it will be understood that although the invention certainly offers advantages for high cotton blends, the invention provide particular advantages for poly-cotton blends with a larger proportion (50% or more) of polyester.

As noted previously, with respect to the composition, in the method steps, the best results to date have been obtained with about 10% adipic acid, about 700 ppm pentaerythritol and about 3.8% polyethylene glycol, all based on the total weight of the copolymer composition.

In another aspect, the invention can be considered as the method of dying a blended yard formed from cotton and textured polyester staple that starts with the composition described herein. Thus, the dyeing step is carried out on a yarn that includes between about 5 and 95 percent by weight cotton, along with the polyester that includes the amounts of adipic acid, pentaerythritol, polyethylene glycol, and diethylene glycol recited with respect to the composition and the method of making the filament.

In another aspect, the invention is the blended yarn itself containing about 5-95% by weight cotton, with the textured polyester as the remainder. The textured polyester has the composition described with respect to the other embodiments. For the sake of completeness these are about 9.5-10.5% adipic acid (10% exemplary), between 630 and 770 ppm of pentaerythritol (700 ppm exemplary), between about 3.4 and 4.2% polyethylene glycol (3.8% exemplary) and between about 2% and 3% of the diethylene glycol byproduct. Again, these amounts are based on the weight of the finished copolymer.

As with the other embodiments, the yarn can be dyed, and formed into fabric and garments with the dyeing being carried out on the blend as opposed to the conventional steps of dyeing cotton separately from polyester.

Thus, using the invention, a blended fabric can be successfully dyed using a single dye; i.e., reactive dye for the cotton or disperse dye for the polyester. Alternatively, if two dyes are preferred—reactive dye for the cotton and disperse dye for the polyester—the invention allows both dyestuffs to be maintained in a single vessel, thus eliminating the conventional rinsing or scouring step between a disperse dyeing step for the polyester and a direct dyeing step for the cotton. In particular, the polyester can be dyed first with the disperse dye at an acidic pH, while at a temperature that avoids degrading the reactive dye. After the polyester is dyed, the pH can be increased to the basic side using a combination of sodium hydroxide (NaOH) and sodium chloride (NaCl) to dye the cotton. In turn, the invention provides the advantages of less water used and less effluent produced.

On a production or continuous scale, the invention is expected to be formed and used in steps with which the skilled person is quite familiar. Thus, as a predictive example, the terephthalic acid and ethylene glycol are mixed into a paste (or slurry) at a mole ratio of between about 1:1 and 1.2:1 (TA to EG). The paste is then transferred to a primary esterifier ("PE") under above-atmospheric pressure (i.e., a pressurized vessel) and temperatures above 250° C. The composition forms the esterified monomer (usually representing about 90 percent esterification). This product is then transferred to a secondary esterifier, at which point the pentaerythritol and adipic acid can be added. Pressures in the secondary esterifier are lower than the primary esterifier, but temperatures are slightly higher. Esterification reaches (for example) about 94% in the secondary esterifier.

The esterified composition is then transferred to the low polymerizer, and if desired the pentaerythritol and adipic acid alternately can be added between the secondary esterifier and the low polymerizer. The low polymerizer operates at a temperature of about 265-280° C., and under a vacuum to remove the water vapor (the polymerization is a condensation reaction) and the monomers reach a degree of polymerization of about 75-100. The composition is then transferred to a high polymerizer where polymerization reaches much higher numbers, typically on the order of 20,000 units.

Intrinsic viscosity is typically measured in a capillary viscometer using a sample of the polymer dissolved in an appropriate solvent. As an alternative, instruments are available that can measure the intrinsic viscosity directly and without the step of dissolving the polymer in a solvent. The intrinsic viscosities described herein can be measured or confirmed using, for example ASTM D5225 ("Standard Test Method for Measuring Solution Viscosity of Polymers with a Differential Viscometer") or any test or instrument that gives the same results within an acceptable tolerance or margin of error.

With respect to the invention (and in many cases in general) color fastness represents the resistance of a dyed color to fading or bleeding under various types of influences on the yarn, fabric, or garment. Exposure to water, light, rubbing, washing, and perspiration are typical. Color fastness testing seeks to identify the properties of the material in a manner that is helpful and reproducible.

In a typical test, (AATCC Test Method 61-2013; Colorfastness to Laundering: Accelerated) the fabric color loss and surface changes resulting from detergent solution and abrasive action of five typical hand or home launderings, with or without chlorine, are roughly approximated by one 45 minute test. Samples are exposed to conditions of temperature, detergent solution, bleaching and abrasive action that are expected to produce a color change representative of five hand or home launderings. Standard tests have also been developed by the Society of Dyers and Colorists (SDC; www.sdc.org.uk; accessed Jul. 24, 2015) and the International Organization for Standardization (ISO; www.iso.org; accessed Jul. 24, 2015).

Light fastness (i.e., color fastness under exposure to light) can also be carried out using a high energy xenon fadometers under defined conditions of radiation intensity cycle time (light and dark) and temperature. AATCC Test Method 169-2009, "Weather Resistance of Textiles: Xenon Lamp Exposure," is an appropriate test.

The resulting color differences can be evaluated using standardized gray scale and gray scale testing methods (e.g., ASTM D2616-12; "Standard Test Method for Evaluation of Visual Color Difference With a Gray Scale").

This one vessel two-step process avoids of the need to empty the dye vessel ("pot") after the polyester dying step and to refill it for the cotton dying step. At a minimum this provides a significant time savings which becomes cumulatively advantageous for repeated dyeing steps. Secondly, because the temperature of the bath can be the same for both the cotton and polyester dyeing steps, less heating is required, as is the time required for re-heating. The result is a fully dyed blended fabric from the single dye bath.

Other tests used or useable to identify and compare the properties of the invention include one or more of the following.

AATCC 61 is a test developed by the American Association of Textile Chemists and Colorists (Research Triangle Park North Carolina USA). The details of the test are available from the association at AATCC.org/test/methods/test-method-61/; accessed Mar. 3, 2016.

The test evaluates the colorfastness with respect to laundering of textiles that are expected to withstand frequent laundering. Specimens are tested "under appropriate conditions of temperature, detergent solution, bleaching and abrasive action such that the color change is similar to that occurring in five hand or home launderings.

The shrinkage test is AATCC 135. Again this is proprietary in its details, but generally consists of marking a sample section of the fabric at selected measured distances, laundering the fabric in a predetermined manner, including drying, and then re-measuring the position of the marks to determine the amount of shrinkage.

Crocking (AATCC 8) is used to determine the amount of color that transfers from one sample fabric to another fabric by rubbing. The sample fabric to be tested is fastened to a crock meter and then rubbed against a white test cloth. The test is carried out both with a dry test cloth and then a wet test cloth. The amount of color transferred to the test cloth is assessed by comparison with the AATCC chromatic transference scale. The details of the test are proprietary to AATCC, but are publicly available and well understood by the skilled person.

The fabrics were also tested under AATCC skewing (skew, skewness) test method 179 which again is proprietary to AATCC, but publicly available and well understood in the art. The test determines the change in skewness in woven and knitted fabrics, or twisting garments when subjected to testing that mimics repeated automatic laundering procedures commonly used in home laundering. The test defines particular washing and drying procedures for obtaining the measured results. To some extent skewness testing gives an indication of the degree to which the yarns or courses in a fabric will be distorted from their intended and manufacture design.

Colorfastness with respect to commercial and domestic hot laundering can also be determined using ISO test number 105-C06. The exact test apparatus, materials and reagents and procedures are proprietary to the International Standards Organization (web address), but again are publicly available (subscription or individual purchase cost) and well understood by the skilled person.

Related tests deal with perspiration fastness (ISO 105-E04) water fastness (ISO 105-E01); and light fastness (ISO 105-B02).

In general, perspiration testing is carried out using two standard solutions that mimic perspiration, but with one being slightly acidic (e.g., pH 5.5) and one being slightly basic (e.g. pH 8.0).

In the specification there has been set forth a preferred embodiment of the invention, and although specific terms have been employed, they are used in a generic and descriptive sense only and not for purposes of limitation, the scope of the invention being defined in the claims.

The invention claimed is:

1. A composition with advantages for textile fibers, the composition consisting essentially of a melt of:
   polyester precursors selected from the group consisting of terephthalic acid, dimethyl terephthalate, and ethylene glycol;
   between about 9.5 and 10.5 weight percent adipic acid based on the amount of melt;
   between about 630 and 770 parts per million (ppm) of pentaerythritol based on the amount of melt;
   between about 3.4 and 4.2 weight percent polyethylene glycol based on the amount of melt; and
   between about 2 and 3 weight percent diethylene glycol based on the amount of melt.

2. A polyester copolymer filament made from the melt according to claim 1.

3. A dyed yarn formed of a blend of:
   cotton fibers; and
   staple fibers cut from a textured filament made from the polyester copolymer filament according to claim 2.

4. The composition according to claim 1, wherein:
   said pentaerythritol is present in an amount of about 700 ppm based upon the amount of melt; and
   said adipic acid is present in an amount of about 10 weight percent based upon the amount of melt.

5. The composition according to claim 1, wherein said polyethylene glycol is present in an amount of about 3.8 weight percent based upon the amount of melt.

6. The composition according to claim 5, wherein said polyethylene glycol has a molecular weight of about 400 grams per mole.

7. A textile fabric comprising:
   spandex; and
   the polyester copolymer filament according to claim 2.

8. A dyed knitted fabric according to claim 7.

9. A dyed woven fabric according to claim 8.

10. A method of forming a composition having advantages for textile fibers and consisting essentially of a melt, the method comprising:
    forming the melt, wherein the melt comprises:
      polyester precursors selected from the group consisting of terephthalic acid, dimethyl terephthalate, and ethylene glycol;
      between about 9.5 and 10.5 weight percent adipic acid based on the amount of melt;
      between about 630 and 770 parts per million (ppm) of pentaerythritol based on the amount of melt;
      between about 3.4 and 4.2 weight percent polyethylene glycol based on the amount of melt; and
      between about 2 and 3 weight percent diethylene glycol based on the amount of melt; and
    maintaining the melt at a temperature of between about 265° C. and 280° C., and at an intrinsic viscosity of between about 0.58 and 0.82.

11. The method according to claim 10, wherein the melt is maintained at an intrinsic viscosity of 0.72.

* * * * *